US012055111B2

(12) United States Patent
Ghazi et al.

(10) Patent No.: US 12,055,111 B2
(45) Date of Patent: Aug. 6, 2024

(54) EXHAUST CATALYST LIGHT-OFF IN AN OPPOSED-PISTON ENGINE

(71) Applicant: ACHATES POWER, INC., San Diego, CA (US)

(72) Inventors: Ahmad Ghazi, San Diego, CA (US); Daniel M. Schum, San Diego, CA (US); Fabien G. Redon, San Diego, CA (US); Samrat M. Patil, San Diego, CA (US)

(73) Assignee: Achates Power, Inc., San Diego, CA (US)

( * ) Notice: Subject to any disclaimer, the term of this patent is extended or adjusted under 35 U.S.C. 154(b) by 0 days.

(21) Appl. No.: 18/495,621

(22) Filed: Oct. 26, 2023

(65) Prior Publication Data

US 2024/0060455 A1 Feb. 22, 2024

Related U.S. Application Data

(62) Division of application No. 17/568,601, filed on Jan. 4, 2022, now Pat. No. 11,815,042, which is a division (Continued)

(51) Int. Cl.
*F02D 41/06* (2006.01)
*F01N 11/00* (2006.01)
(Continued)

(52) U.S. Cl.
CPC .......... *F02D 41/0245* (2013.01); *F01N 11/00* (2013.01); *F02B 25/08* (2013.01);
(Continued)

(58) Field of Classification Search
CPC ............. F02D 41/0245; F02D 41/0007; F02D 41/0255; F02D 41/401; F02D 2041/389;
(Continued)

(56) References Cited

U.S. PATENT DOCUMENTS 7,261,068 B1 8/2007 Nuang
7,654,079 B2 2/2010 Ruth et al.
(Continued)

FOREIGN PATENT DOCUMENTS

CN 109139200 A * 1/2019 ............. B01D 53/94
CN 113853478 A 12/2021
(Continued)

OTHER PUBLICATIONS

Randy E. Herold, Michael H. Wahl, Gerhard Regner, and James U. Lemke, "Thermodynamic Benefits of Opposed-Piston Two-Stroke Engines" SAE Technical Paper 2011-01-2216, (published Sep. 13, 2011).
(Continued)

*Primary Examiner* — Jonathan R Matthias
(74) *Attorney, Agent, or Firm* — Terrance A. Meador

(57) ABSTRACT

In an opposed-piston engine which includes a catalytic aftertreatment device in its exhaust system an exhaust gas condition indicating a catalyst temperature of the aftertreatment device is monitored. When the catalyst temperature is near or below a light-off temperature, a catalyst light-off procedure is executed to elevate the temperature of the catalyst.

4 Claims, 6 Drawing Sheets

Related U.S. Application Data of application No. 16/400,924, filed on May 1, 2019, now Pat. No. 11,242,809.

(51) Int. Cl.

| | |
|---|---|
| ***F02B 25/08*** | (2006.01) |
| ***F02B 37/18*** | (2006.01) |
| ***F02B 37/24*** | (2006.01) |
| ***F02B 75/28*** | (2006.01) |
| ***F02D 41/00*** | (2006.01) |
| ***F02D 41/02*** | (2006.01) |
| ***F02D 41/40*** | (2006.01) |
| *F02D 41/38* | (2006.01) |

(52) U.S. Cl.

CPC .............. *F02B 37/18* (2013.01); *F02B 37/24* (2013.01); *F02B 75/282* (2013.01); *F02D 41/0007* (2013.01); *F02D 41/0255* (2013.01); *F02D 41/401* (2013.01); *F02D 2041/389* (2013.01)

(58) Field of Classification Search

CPC ............... F02D 41/005; F02D 41/3836; F02D 2200/0804; F02D 9/04; F02D 41/1446; F02D 41/40; F02D 41/08; F02D 41/107; F02D 2400/04; F02D 41/1441; F01N 11/00; F01N 3/2013; F01N 2900/1602; F01N 3/035; F01N 3/103; F01N 3/2066; F01N 3/2086; F01N 3/2006; F01N 2240/36; F01N 2260/14; F02B 25/08; F02B 37/18; F02B 37/24; F02B 75/282; F02B 37/04; F02B 37/12; F02B 39/04; Y02T 10/12; Y02T 10/40; F01B 7/14

See application file for complete search history.

(56) References Cited

U.S. PATENT DOCUMENTS

| | | | | |
|---|---|---|---|---|
| 8,355,856 | B2 | 1/2013 | Hartrey et al. | |
| 8,838,316 | B2 | 9/2014 | Whitney et al. | |
| 8,943,804 | B2 | 2/2015 | Schreurs | |
| 9,422,883 | B2 | 8/2016 | Ge et al. | |
| 9,587,573 | B2 | 3/2017 | Genslak et al. | |
| 9,822,683 | B2 | 11/2017 | Tsukamoto et al. | |
| 10,001,073 | B2 | 6/2018 | Gwidt et al. | |
| 10,125,647 | B2 | 11/2018 | Mikami et al. | |
| 10,138,833 | B1 | 11/2018 | Kurtz | |
| 2009/0283070 | A1 | 11/2009 | Whitney et al. | |
| 2011/0107739 | A1 * | 5/2011 | Shimizu | F02D 41/0007 60/273 |
| 2013/0014502 | A1 | 1/2013 | Sato | |
| 2014/0196454 | A1 | 7/2014 | Ulrey et al. | |
| 2015/0033736 | A1 | 2/2015 | Kalebjian et al. | |
| 2015/0114339 | A1 | 4/2015 | Sellnau et al. | |
| 2015/0128907 | A1 | 5/2015 | Redon et al. | |
| 2015/0275795 | A1 | 10/2015 | Cygan et al. | |
| 2017/0204790 | A1 | 7/2017 | Nagar | |
| 2017/0314486 | A1 | 11/2017 | Marlett et al. | |
| 2019/0323407 | A1 | 10/2019 | Dimoski et al. | |
| 2020/0224614 | A1 * | 7/2020 | Hu | F02B 37/10 |
| 2020/0347791 | A1 | 11/2020 | Ghazi et al. | |
| 2021/0140388 | A1 * | 5/2021 | Kusakabe | F02M 51/00 |
| 2022/0128012 | A1 | 4/2022 | Ghazi et al. | |

FOREIGN PATENT DOCUMENTS

| | | | | | |
|---|---|---|---|---|---|
| DE | 10203025 | A1 * | 7/2003 | F01N 3/023 |
| JP | 200869667 | A | 3/2008 | |
| JP | 2009191745 | A | 8/2009 | |
| JP | 2022530650 | A | 6/2022 | |
| WO | 2013126347 | A1 | 8/2013 | |
| WO | 2020223199 | A2 | 11/2020 | |

OTHER PUBLICATIONS

Christopher J. Kalebjian, Fabien G. Redon, Michael W. Wahl, "Low Emissions and Rapid Catalyst Light-Off Capability for Upcoming Emissions Regulations with an Opposed-piston, Two-Stroke Diesel Engine", Global Automotive Management Council, Ypsilanti, Michigan, (published 2012).

Samrat Patil, Ahmad Ghazi, Fabien Redon, Christopher Sharp, Dan Schum, John Headley, "Cold Start HF FTP Results on Multi-Cylinder Opposed-Piston Engine Demonstrating Rapid Exhaust Enthalpy Rise to Achieve Ultra Low NOx", SAE Technical Paper 2018-01-1378, 2018 (published Apr. 3, 2018).

Abhishek Sahasrabudhe, Samrat Patil, "Cold start WHTG transient results on Multi-cylinder Opposed-Piston Engine demonstrating low CO2 emissions while meeting BS-VI emission targets and enabling aftertreatment optimization", SIAT 2019, 19SIAT-0458, (published Jan. 2019).

Office Action for U.S. Appl. No. 16/400,924, mailed Oct. 29, 2020.

Amendment for U.S. Appl. No. 16/400,924, mailed Jan. 27, 2021.

Final Action for U.S. Appl. No. 16/400,924, mailed Feb. 4, 2021.

Appeal Brief for U.S. Appl. No. 16/400,924, mailed Sep. 23, 2021.

Office Action for U.S. Appl. No. 17/568,601 mailed Nov. 21, 2022.

Amendment for U.S. Appl. No. 17/568,601, mailed May 18, 2023.

Invitation to Pay Additional Fees, FORM/ISA/206, with Annex including Partial International Search & Provisional Opinion for PCT Application PCT/US2020/030209, mailed Oct. 8, 2020.

International Search & Written Opinion for PCT Application PCT/US2020/030209, mailed Dec. 2, 2020.

Communication Pursuant to Rules 161(1) and 162 EPC in EP application 20730141.7, mailed Oct. 15, 2021.

Reply to Communication Pursuant to Rules 161(1) and 162 EPC in EP application 20730141.7,submitted Apr. 25, 2022.

Communication Pursuant to Article 94(3) in EP application 20730141.7, mailed Sep. 7, 2023.

Office Action in JP application 2021-564473, mailed Sep. 23, 3036.

English translation of Office Action in JP application 2021-564473, mailed Sep. 23, 3036.

* cited by examiner

EXHAUST CATALYST LIGHT-OFF IN AN OPPOSED-PISTON ENGINE

PRIORITY

This application is a divisional of co-pending U.S. patent application Ser. No. 17/568,601, filed Jan. 4, 2022, for "Exhaust Catalyst Light-Off In An Opposed-Piston Engine", which is a divisional of U.S. patent application Ser. No. 16/400,924, filed May 1, 2019, for "Exhaust Catalyst Light-Off In An Opposed-Piston Engine".

TECHNICAL FIELD

The invention concerns catalyst light-off in an opposed-piston engine operated by compression-ignited combustion of an air/fuel mixture.

BACKGROUND

An opposed-piston engine is an internal combustion engine characterized by an arrangement of two pistons disposed in the bore of a cylinder for reciprocating movement in opposing directions along the central axis of the cylinder. In many cases, an opposed-piston engine completes a cycle of operation with a single complete rotation of a crankshaft and two strokes of a piston connected to the crankshaft. The strokes are typically denoted as compression and power strokes. Each piston moves between a bottom center (BC) region where it is nearest one end of the cylinder and a top center (TC) region within the cylinder where it is furthest from the one end and closest to the other piston. During a compression stroke, the pistons move away from BC positions, toward each other, compressing charge air between their end surfaces. As the pistons pass through their TC locations, fuel injected into and mixed with the compressed charge air is ignited by the heat of the compressed air, and combustion follows, initiating the power stroke. During the power stroke, the pressure of combustion produced urges the pistons apart, toward their BC locations. The cylinder has ports near respective BC regions. Each of the opposed pistons controls a respective one of the ports, opening the port as it moves to its BC region, and closing the port as it moves from BC toward its TC region. One port serves to admit charge air (sometimes called "scavenging air") into the bore, the other provides passage for the products of combustion out of the bore; these are respectively termed "intake" and "exhaust" ports (in some descriptions, intake ports are referred to as "air" ports or "scavenge" ports). In a uniflow-scavenged opposed-piston engine, as pressurized charge air enters a cylinder through its intake port near one end of a cylinder, exhaust gas flows out of its exhaust port near the opposite end; thus gas flows through the cylinder in a single direction ("uniflow") —from intake port to exhaust port.

An air handling system of an opposed-piston engine manages the transport of charge air provided to, and exhaust gas produced by, the engine during its operation. A representative air handling system construction includes a charge air subsystem and an exhaust subsystem. The charge air subsystem receives and pressurizes air and includes a charge air passage that delivers the pressurized air to the intake port or ports of the engine. The charge air subsystem may comprise one or both of a turbine-driven compressor and a supercharger. The charge air passage may include at least one air cooler that is coupled to receive and cool the charge air before delivery to the intake ports of the engine. The exhaust subsystem has an exhaust passage that transports exhaust gas from engine exhaust ports for delivery to other exhaust subsystem components such as a turbine that drives the compressor, and an exhaust gas recirculation (EGR) loop that transports exhaust gas to the charge air system.

Internal combustion engines may be equipped with exhaust aftertreatment devices. These are constructed to convert combustion byproducts such as NO, $NO_2$, and soot and other unburned hydrocarbons in the exhaust gas into harmless compounds by thermally-driven processes that may include one or more of catalyzation, decomposition, and filtration. Oxides of nitrogen (collectively, NOx) are removed by selective catalyst reduction (SCR) technology that includes a catalyst which begins operation ("lights off") when it reaches a threshold temperature ("light-off temperature"). Once light-off occurs, the catalytic activity increases with temperature. There is a temperature range ("the effective temperature range") within which a catalyst performs optimally; different catalytic materials have different effective temperature ranges. The heat that causes a catalytic device to operate is obtained from the exhaust gas itself, and the device operates most effectively when exhaust gas enthalpy (heat content) is sufficient to maintain the catalyst within its effective temperature range. An exhaust management strategy for an internal combustion engine equipped with aftertreatment devices including an SCR device seeks to deliver enough exhaust heat to the catalytic device to enable the device to perform optimally. When the catalyst's temperature is below its effective temperature range, catalytic activity declines and catalyzation may cease altogether. Under these circumstances, exhaust enthalpy must be elevated to restore effective catalytic performance.

Thus, when an internal combustion engine equipped with a catalytic aftertreatment device is first started under cold internal and ambient conditions ("cold start") it is important to achieve light-off as fast as possible in order to quickly bring undesirable emissions under control of the aftertreatment device. It is also important to maintain exhaust gas enthalpy at a level that keeps the catalyst in an effective temperature range when an engine has been operating under conditions that cause exhaust gas flow to decrease. Such conditions include idling and low load operation.

Ambient temperature and pressure affect the quality of combustion in internal combustion engines. In compression-ignition engines, charge air in the cylinder is compressed until reaching a temperature required for auto-ignition of air and fuel in the cylinder. In a two-stroke cycle, opposed-piston engine operating by compression-ignition, the quality of combustion can be affected by in-cylinder temperature variations and intake and exhaust interactions that occur during scavenging before or at ignition. This sensitivity may be manifested by misfiring and/or ragged combustion when starting the engine, especially under cold conditions before in-cylinder temperatures build to a level that supports stable combustion.

One of the main goals of governmental policy pertaining to emissions associated with diesel combustion has been to push tailpipe engine-out NOx to historically low levels. It is especially beneficial to increase the exhaust enthalpy of a diesel engine as quickly as possible so as to enable an SCR system to reach operational effectiveness within the shortest possible time. When an engine is started cold, its combustion characteristics are very different than during normal operating conditions. During the period in which the engine starts until its exhaust enthalpy rises to a level that causes catalyst light-off, an SCR system will not be effective at reducing the engine-out NOx. During a cold start, tailpipe emissions are higher than during a warm start, and even higher than when the engine idles while warm. Consequently, it is desirable to raise the catalyst temperature to a light-off level as quickly as possible while keeping NOx emissions to acceptable levels; necessarily, this includes rapidly achieving stable combustion.

It is useful to configure the exhaust subsystem of an opposed-piston engine with aftertreatment devices that cleanse exhaust gas of undesirable components as it is transported through the devices before being emitted into the atmosphere. Particularly, it is desirable for a two-stroke cycle, uniflow-scavenged, compression ignition, opposed-piston engine to be able to rapidly raise exhaust enthalpy in order to quickly light off a selective catalyst reduction device after cold starting the engine, while maintaining exhaust enthalpy at a level that keeps the catalyst in an effective temperature range during regular operation of the engine.

A solution to the problem of quickly achieving stable combustion of an opposed-piston engine under cold start conditions is presented in US patent publication 2015/0128907. The solution includes, before injecting fuel, preventing air flow through the engine while cranking it to heat air retained in the engine, followed by controlling mass air flow through and fuel injection into the engine so as to create and preserve heat for stable combustion and transition to an idling state of operation.

PCT international publication WO 2013/126347 describes a strategy for managing exhaust temperature of an opposed-piston engine with EGR, based on control of a ratio of a mass of fresh air and EGR delivered to a cylinder to the mass of the charge trapped in the cylinder. The strategy is implemented by determining a value of trapped temperature in a cylinder of the engine during engine operation and maintaining that value in a predetermined range. Control of the trapped temperature is effected by controlling a modified air delivery ratio which is defined as a mass of charge air delivered to a cylinder divided by a mass of charge retained in the cylinder at closure of the last port of the cylinder (which is, typically, the intake port) during an engine cycle. A low value of the modified air delivery ratio results in a higher level of internal residuals, thereby leading to an increase in trapped temperature.

The cold start strategy for an opposed-piston presented in US patent publication 2015/0128907 does not include any specific procedures for achieving rapid catalyst light-off once stable combustion is achieved. The exhaust control strategy for an opposed-piston described in PCT international publication WO 2013/126347 is based on trapped temperature in a cylinder, and may, in some cases, be incomplete, if not inaccurate, for failing to account for heat loss during transport of the exhaust gas from the cylinder to an aftertreatment device. Neither patent publication presents a complete exhaust control method directed to achieving low NOx emission levels over an operational cycle when heat energy must be rapidly provided to an exhaust system during a cold start of an opposed-piston, and peak NOx reduction efficiency must be maintained during regular operation of the engine after it is started.

SUMMARY OF THE INVENTION

An object of the invention is to provide a method of operating an opposed-piston engine in such a manner as to achieve rapid light-off of a catalytic aftertreatment device disposed in an exhaust passage of the opposed-piston engine which is performed by sensing an exhaust gas condition indicative of a temperature of a catalyst of the catalytic aftertreatment device while the opposed-piston engine is operating and initiating a catalyst light-off procedure in response to the exhaust gas condition according to an operating state or condition of the opposed-piston engine.

When the opposed-piston engine is in an idling state, the catalyst light-off procedure is conducted by increasing mass airflow into the opposed-piston engine and closing a back-pressure valve disposed in the exhaust passage.

When the opposed-piston is in a tip-in transient condition, the catalyst light-off procedure is conducted by increasing the mass airflow into the opposed-piston engine, increasing an amount of fuel injected into the engine, and advancing an injection timing of the injected fuel.

When the opposed-piston engine is in a tip-out transient condition, the catalyst light-off procedure is conducted by decreasing the mass airflow into the opposed-piston engine, and retarding the injection timing of the injected fuel.

When the exhaust gas condition indicates that the temperature of the catalyst exceeds a catalyst light-off threshold during the catalyst light-off procedure, the opposed-piston engine is transitioned to a normal operating condition.

In specific aspects of the invention, a catalyst light-off procedure is initiated when the exhaust gas condition is less than a threshold indicative of a light-off temperature of the catalytic aftertreatment device. The exhaust gas condition which is monitored may include exhaust gas temperature or exhaust gas enthalpy.

In view of the aforementioned conventional omissions, it is also an object of the present invention to provide a catalyst light-off apparatus for an opposed-piston engine, wherein the catalyst light-off apparatus is configured to light off a selective catalyst reduction device of an aftertreatment system by controlling the temperature or the enthalpy of a stream of exhaust gas, and to maintain effective catalytic activity while the engine operates in an idling state or a transient condition.

The invention portrayed by the following embodiments may be practiced in various opposed-piston engine applications, including, without limitation, vehicles, vessels, aircraft, and stationary emplacements.

DETAILED DESCRIPTION OF A PREFERRED EMBODIMENT

Figure 1:
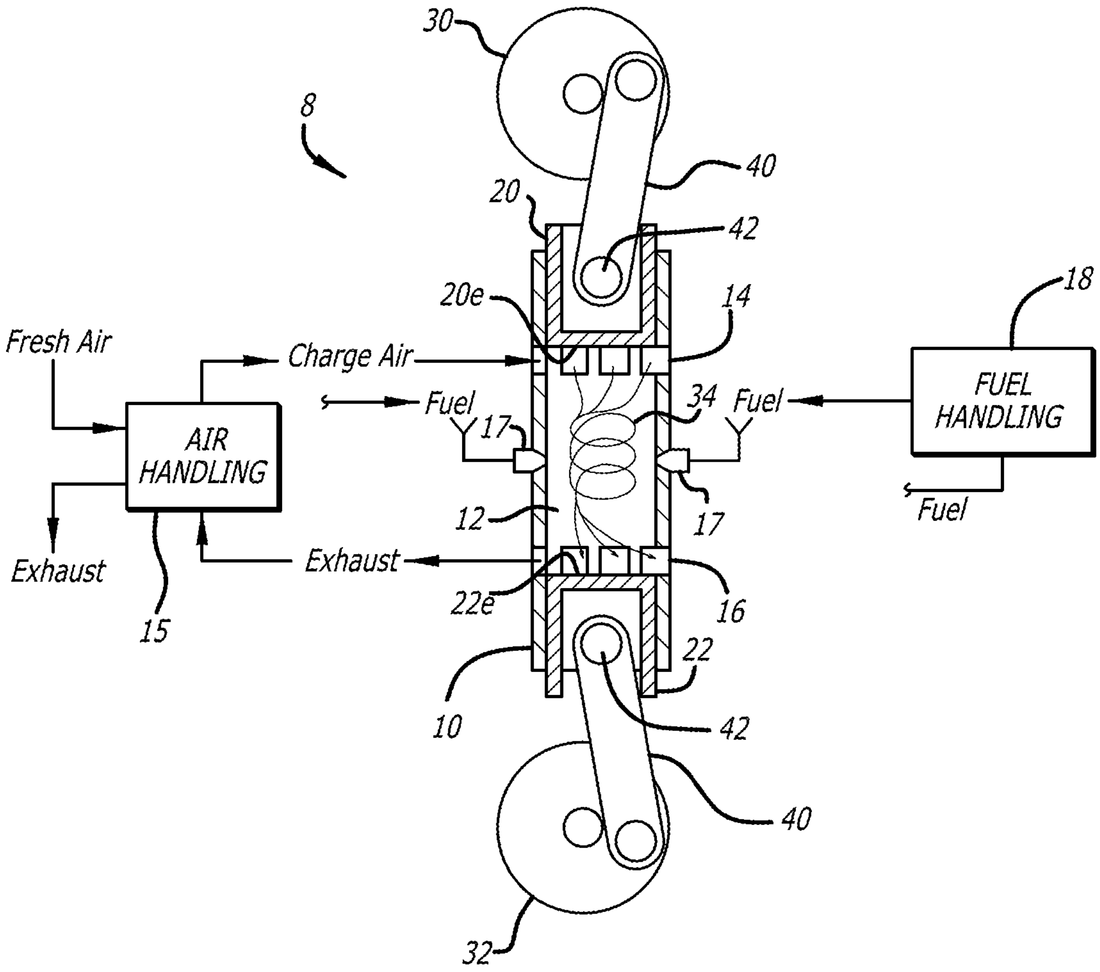
FIG. 1 (Prior Art)
FIG. 1 is a schematic illustration of an exemplary opposed-piston engine of the prior art.

FIG. 1 is a schematic representation of an exemplary opposed-piston engine. Preferably, but not necessarily, the engine is a two-stroke cycle, uniflow-scavenged, opposed-piston engine of the compression ignition type (hereinafter, "the opposed-piston engine 8") that includes at least one cylinder. The opposed-piston engine 8 may have one cylinder, or it may comprise two or more cylinders. In any event, the cylinder 10 represents both single cylinder and multi-cylinder configurations of the opposed-piston engine 8. The cylinder 10 includes a bore 12 and longitudinally displaced intake and exhaust ports 14 and 16 machined, molded, or otherwise formed in the cylinder, near respective ends thereof. An air handling system 15 of the opposed-piston engine 8 manages the transport of charge air into, and exhaust out of, the engine by way of these ports. Each of the intake and exhaust ports includes one or more openings communicating between the cylinder bore and an associated manifold or plenum. In many cases a port comprises one or more circumferential arrays of openings in which adjacent openings are separated by a solid portion of the cylinder wall (also called a "bridge"). In some descriptions, each opening is referred to as a "port"; however, the construction of a circumferential array of such "ports" is no different than the port constructions illustrated in FIG. 1. Fuel injectors 17 include nozzles that are secured in threaded holes that open through the sidewall of the cylinder. A fuel system 18 of the opposed-piston engine 8 provides fuel for direct side injection by the injectors 17 into the cylinder. Two pistons 20, 22 are disposed in the bore 12 with their end surfaces 20*e*, 22*e* in opposition to each other. For convenience, the piston 20 is referred to as the "intake" piston because it opens and closes the intake port 14. Similarly, the piston 22 is referred to as the "exhaust" piston because it opens and closes the exhaust port 16. Preferably, but not necessarily, the intake piston 20 and all other intake pistons are coupled to a crankshaft 30 of the opposed-piston engine 8; and, the exhaust piston 22 and all other exhaust pistons are coupled to a crankshaft 32 of the engine 8.

Operation of the opposed-piston engine 8 is well understood. In response to compression-ignited combustion occurring between their end surfaces, the opposed pistons move away from respective TC locations where they are at their innermost positions in the cylinder 10. While moving from TC, the pistons keep their associated ports closed until they approach respective BC locations where they are at their outermost positions in the cylinder and their associated ports are open. The pistons may move in phase so that the intake and exhaust ports 14, 16 open and close in unison. Alternatively, one piston may lead the other in phase, such that the intake and exhaust ports have different opening and closing times. As charge air enters the cylinder 10 through the intake port 14, the shapes of the intake port openings cause the charge air to swirl in a vortex about the cylinder's longitudinal axis, which spirals in the direction of the exhaust port 16. A swirl vortex 34 promotes air/fuel mixing, combustion, and suppression of pollutants.

Figure 2:
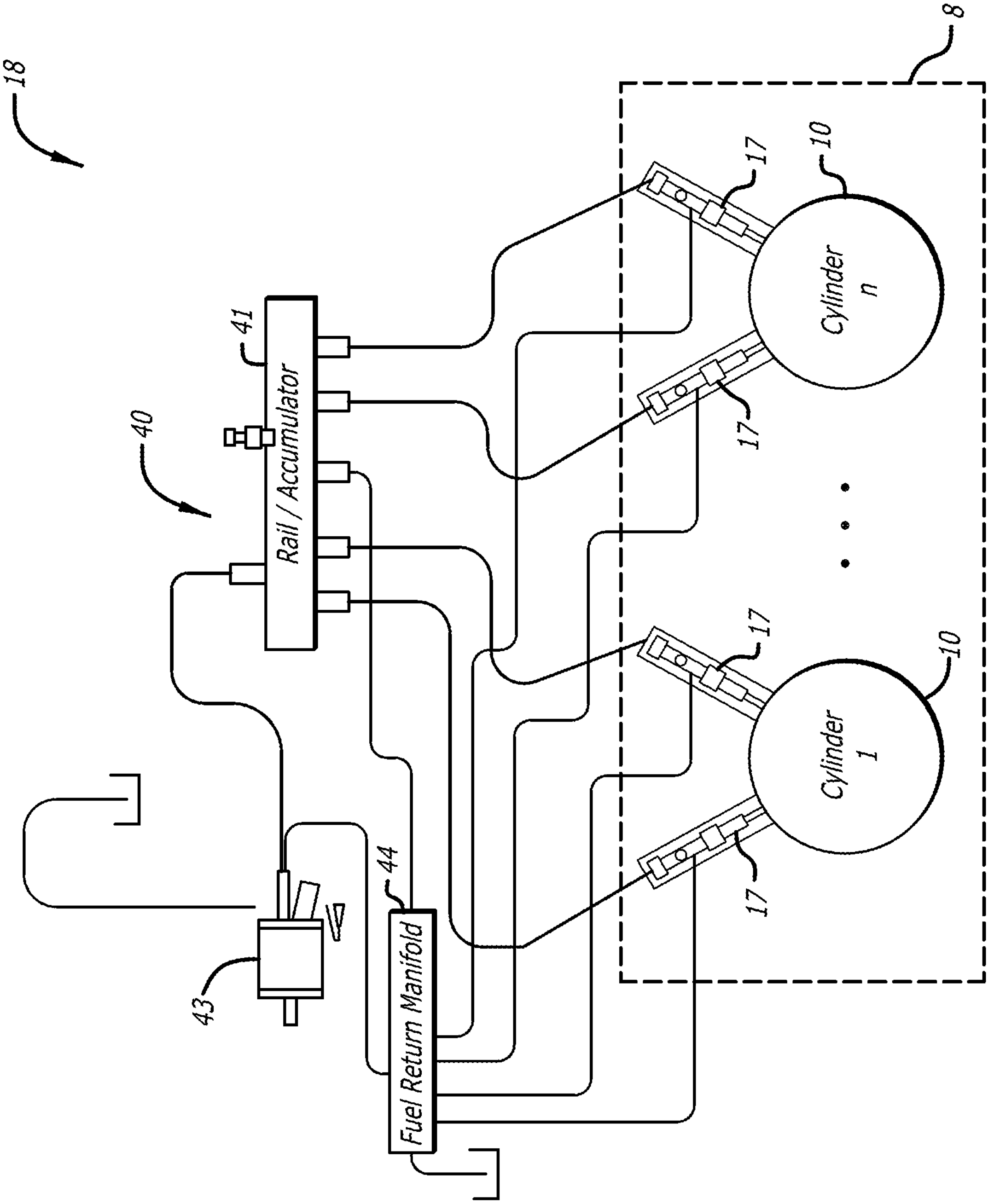
FIG. 2 is a schematic diagram illustrating a fuel injection system embodiment of the engine of FIG. 1.

FIG. 2 shows the fuel system 18, which may be embodied in a common rail direct injection fuel system. The fuel system 18 delivers fuel to each cylinder 10 by direct side injection into the cylinder. Preferably, each cylinder 10 is provided with multiple fuel injectors mounted for direct injection through a cylinder sidewall into cylinder space between the end surfaces of the pistons. For example, each cylinder 10 has two fuel injectors 17. Preferably, fuel is fed to the fuel injectors 17 from a fuel source 40 that includes at least one rail/accumulator mechanism 41 to which fuel is pumped by a fuel pump 43. A fuel return manifold 44 collects fuel from the fuel injectors 17 and the fuel source 40 for return to a reservoir from which the fuel is pumped. Elements of the fuel source 40 are operated by respective computer-controlled actuators that respond to fuel commands issued by an engine control unit (ECU). Although FIG. 2 shows the fuel injectors 17 of each cylinder disposed at an angle of less than 180°, this is merely a schematic representation and is not intended to be limiting with respect to the locations of the injectors or the directions of the sprays that they inject. In a preferred arrangement, best seen in FIG. 1, the injectors 17 are disposed for injecting fuel sprays in opposing radial directions of the cylinder 10 with respect to an injection axis. Preferably, each fuel injector 17 is operated by a respective computer-controlled actuator that responds to injector commands issued by an ECU.

Figure 3:
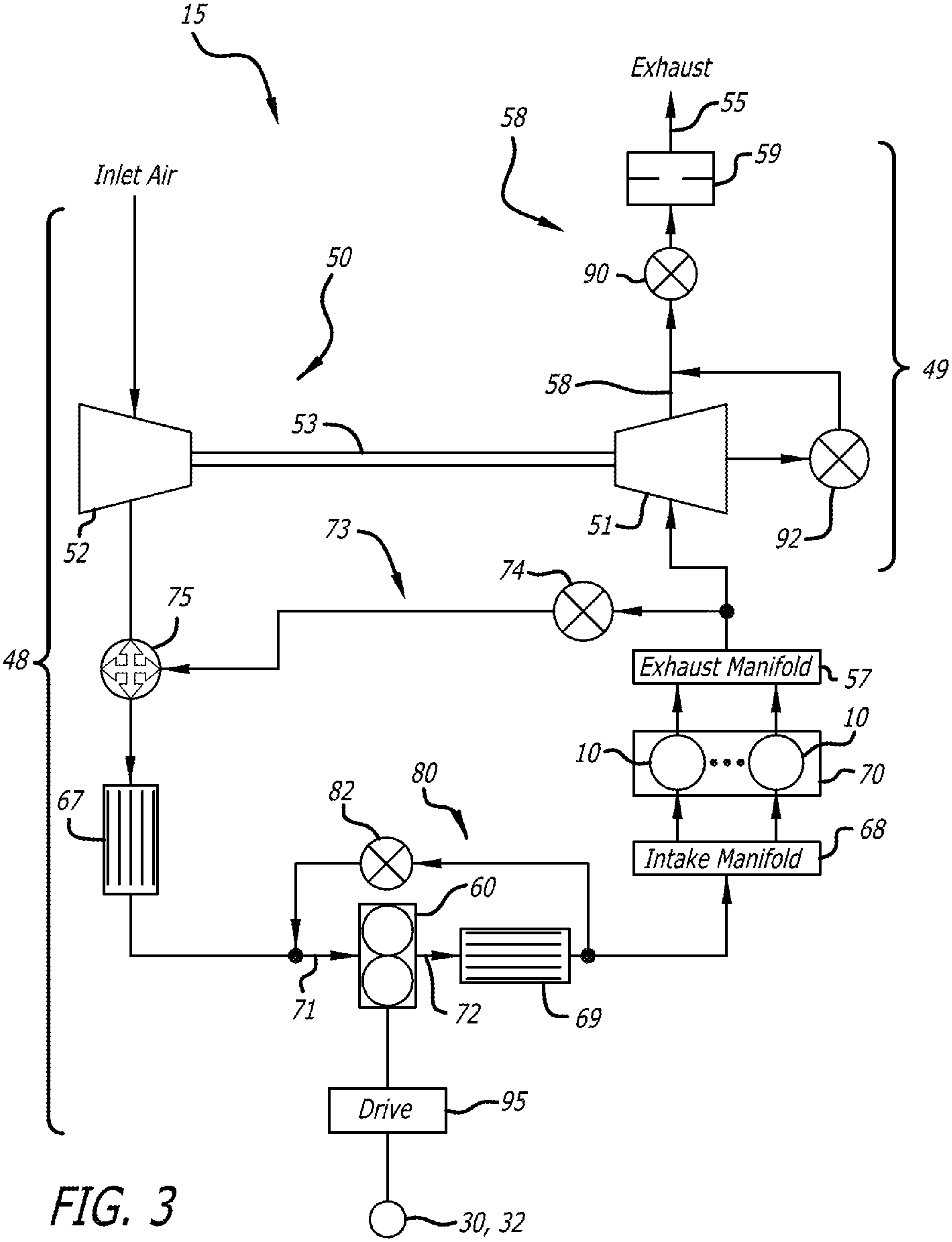
FIG. 3 is a schematic diagram illustrating an air handling system embodiment of the engine of FIG. 1.

FIG. 3 shows an embodiment of the air handling system 15 that manages the transport of charge air provided to, and exhaust gas produced by, the opposed-piston engine 8. A representative air handling system construction includes a charge air passage 48 and an exhaust passage 49. In the air handling system 15, a charge air source receives fresh air and processes it into charge air. The charge air passage 48 receives the charge air and transports it to the intake ports of the opposed-piston engine 8. The exhaust passage 49 is configured to transport exhaust gas from exhaust ports of the engine for delivery to other exhaust components in the exhaust subsystem such as a turbine, various valves, and exhaust aftertreatment devices.

The air handling system 15 includes a turbocharger system that may comprise one or more turbochargers. For example, a turbocharger 50 includes a turbine 51 and a compressor 52 that rotate on a common shaft 53. The turbine 51 is disposed in the exhaust passage 49 and the compressor 52 is disposed in the charge air passage 48. The turbocharger 50 extracts energy from exhaust gas that exits the exhaust ports and flows into the exhaust passage 49 directly from engine exhaust ports 16, or from an exhaust manifold 57 that collects exhaust gases flowing from the exhaust ports. Preferably, in a multi-cylinder opposed-piston engine, the exhaust manifold 57 comprises an exhaust plenum or chest that communicates with the exhaust ports 16 of all cylinders 10, which are supported or cast in a cylinder block 70. The turbine 51 is rotated by exhaust gas passing through it. This rotates the compressor 52, causing it to generate charge air by compressing fresh air. Exhaust gases from the exhaust ports of the cylinders 10 flow into the exhaust manifold 57 and therethrough to an inlet of the turbine 51. From the turbine's outlet exhaust gas flows through one or more aftertreatment devices 59 to an exhaust outlet 55.

The charge air subsystem may provide inlet air to the compressor 52 through an air filter (not shown). As the compressor 52 rotates it compresses inlet air, and the compressed (i.e., "pressurized") inlet air flows into an inlet of a supercharger 60 configured to pump pressurized intake air to an intake port or intake ports of the engine. In this regard, air compressed by the compressor 52 and pumped by the supercharger 60 flows from the supercharger's outlet into an intake manifold 68. Pressurized charge air is delivered from the intake manifold 68 to the intake ports 14 of the cylinders 10. Preferably, in a multi-cylinder opposed-piston engine, the intake manifold 68 comprises an intake plenum or chest that communicates with the intake ports 14 of all cylinders 10.

The charge air subsystem may further include at least one cooler coupled to receive and cool charge air before delivery to the intake ports of the opposed-piston engine 8. In these instances, charge air provided by the compressor 52 flows through a cooler 67, from where it is pumped by the supercharger 60 to the intake ports. A second cooler 69 may be provided between the outlet of the supercharger 60 and the intake manifold 68.

The air handling system 15 may include an exhaust gas recirculation (EGR) loop of the high pressure type, the low pressure type, or a combination thereof. An example is a high pressure EGR loop 73, which includes an EGR valve 74 and a mixer 75. Exhaust is recirculated through the EGR loop 73, under control of the EGR valve 74. The EGR loop 73 is coupled to the charge air subsystem via the EGR mixer 75. In some instances, although not necessarily, an EGR cooler (not shown) may be provided in the EGR loop 73.

With further reference to FIG. 3, the air handling system 15 is equipped for control of gas flow at separate control points in the charge air and exhaust subsystems. In the charge air subsystem, charge air flow and boost pressure can be controlled by operation of a supercharger bypass loop 80 (sometimes referred to as a "supercharger recirculation loop" or a "supercharger shunt loop") configured to circulate air from an outlet 72 of the supercharger to an inlet 71 of the supercharger. The supercharger bypass loop 80 includes a supercharger bypass valve (hereinafter, "bypass valve") 82 that governs the flow of charge air into, and thus the pressure in, the intake manifold 68. More precisely, the bypass valve 82 shunts the charge air flow from the supercharger's outlet 72 (high pressure) to its inlet 71 (lower pressure). Sometimes the bypass valve 82 may be referred to as a "recirculation" valve or a "shunt" valve. A backpressure valve 90 in the exhaust outlet passage 58 governs the flow of exhaust out of the turbine, and thus the backpressure in the exhaust passage for various purposes, including modulation of the exhaust gas temperature. As per FIG. 3, the backpressure valve 90 may be positioned in the exhaust outlet passage 58, on a downstream side of the outlet of the turbine 51. A wastegate 92 may be provided to divert exhaust gasses away from the turbine wheel, which enables regulation of the speed of the turbine. Regulating the turbine speed enables regulation of the compressor speed which, in turn, enables control of charge air boost pressure. The valves 74, 82, and 90, and the wastegate 92, are opened and closed by respective computer-controlled actuators that respond to rotational commands issued by an ECU. In some cases, these valves may be controlled to two states: fully opened or fully closed. In other cases, any one or more of the valves may be variably or continuously adjustable to states between fully opened and fully closed.

In some instances, control of gas flow and pressure in the air handling system may also be provided by a variable speed supercharger system. In these aspects, the supercharger 60 may be coupled by a supercharger drive mechanism (hereinafter, "drive") 95 to a crankshaft 30 or 32 of the opposed-piston engine 8, to be driven thereby. The drive 95 may comprise a stepwise transmission device, or a continuously variable transmission device, in which cases charge air flow, and boost pressure, may be varied by varying the speed of the supercharger 60 in response to a signal provided to the drive 95. In other instances, the supercharger may be a single-speed device with a mechanism to disengage the drive, thus giving two different drive states. In yet other instances, a disengagement mechanism may be provided with a stepwise or continuously variable drive. Alternatively, the supercharger drive mechanism may comprise an electric motor. In any event, the drive 95 is actuated by commands issued by an ECU.

The turbine 51 may be a variable-geometry turbine (VGT) device having an effective aspect ratio that may be varied in response to changing speeds and loads of the engine. Alteration of the aspect ratio enables regulation of the speed of the turbine 51. Regulation of the turbine speed enables control of the compressor speed which, in turn, permits control of charge air pressure. In many cases, a turbocharger comprising a VGT may not require a wastegate. A VGT device is operated by a computer-controlled actuator that responds to turbine commands issued by an ECU. Alternatively, the turbine 51 may comprise a fixed-geometry device.

In this disclosure, an engine control mechanization is a computer-based system comprising a programmed controller, a plurality of sensors, a number of actuators, and other machines devices distributed throughout the opposed-piston engine 8. The control mechanization governs operations of various engine systems, including the fuel system, the air handling system, a cooling system, a lubrication system, and other engine systems. The programmed controller includes one or more ECUs electrically connected to associated sensors, actuators, and other machine devices. As per FIG. 4, control of the fuel system of FIG. 2 and the air handling system of FIG. 3 (and, possibly, other systems of the opposed-piston engine 8) is implemented by a control mechanization that includes a programmable ECU 94. The ECU 94 is constituted of one or more microprocessors, memory, I/O portions, converters, drivers, and so on, and is programmed to execute fuel handling algorithms and air handling algorithms under various engine operating conditions. Such algorithms are embodied in control modules that are part of an engine systems control program executed by the ECU 94 to regulate operations of the engine 8.

For the exemplary common rail direct injection system, the ECU 94 controls injection of fuel into the cylinders by issuing rail pressure (Rail) commands to the fuel source 40, and by issuing injector (Injector) commands for operation of the injectors 17. For the air handling system the ECU 94 controls the transport of gas (intake air and exhaust) through the opposed-piston engine 8 by issuing backpressure (Backpressure), wastegate (Wastegate) and bypass (Bypass) commands to open and close the exhaust backpressure valve 90, the wastegate 92, and the bypass valve 82, respectively. In cases where the supercharger 60 is operated by a variable drive or an electric motor, the ECU 94 also controls gas transport by issuing drive (Drive) commands to actuate the drive 95. And, in those instances where the turbine 51 is configured as a variable geometry device, the ECU 94 also controls gas flow by issuing VGT commands to set the aspect ratio of the turbine.

Various sensors measure physical conditions throughout the opposed-piston engine 8. A sensor may comprise a physical device or a virtual device. Physical sensors are electrically connected to the ECU 94. Virtual sensors are embodied in calculations performed by the ECU 94. When the opposed-piston engine 8 runs, the ECU 94 determines the current engine operating state based on various conditions such as engine load and engine speed, and governs the amount, pattern, and timing of fuel injected into each cylinder 10 by control of common rail fuel pressure and injection duration, based on the current engine operating state. For example, the ECU 94 may be operatively connected to an engine load sensor 96 (which may represent an accelerator position sensor, a torque sensor, a speed governor, or a cruise control system, or any equivalent means) for detecting changes in engine load, an engine speed sensor 97 that detects the position (crank angle, or CA), direction of rotation, and rotational speed of the crankshaft 32, and a sensor 98 that detects rail pressure (there may be two such sensors if the engine is equipped with a dual common-rail fuel system). Some sensors detect gas mass flow, pressure, and temperature at certain locations in the air handling system. These sensors enable the ECU 94 to execute tasks to control the air handling system 15 during operation of the opposed-piston engine 8. These sensors include a mass air flow sensor 100 and an exhaust gas temperature sensor arrangement comprising a first exhaust gas temperature sensor 102. The mass air flow sensor 100 detects a mass flow of air through the charge air passage 48 to the inlet of the compressor 52. The exhaust gas temperature sensor 102 detects a temperature of exhaust gas flowing in the exhaust passage 49.

Figure 4:
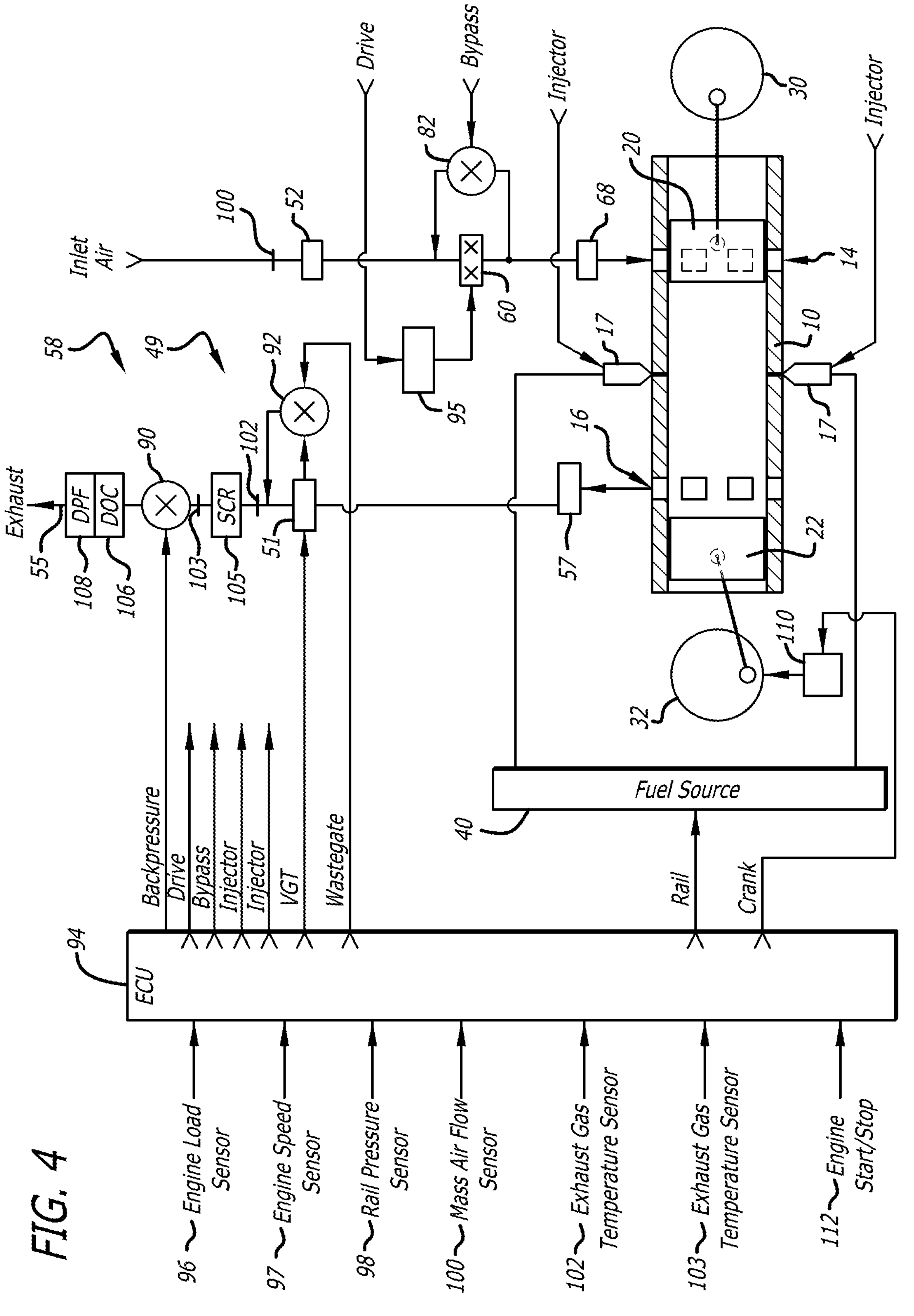
FIG. 4 is a schematic diagram illustrating the exemplary opposed-piston engine equipped for fast catalyst light-off according to the invention.

Catalyst Light-off: As shown in FIG. 4, the exemplary opposed-piston engine 8 may be equipped for fast light-off of a catalytic device 105 disposed in the exhaust passage 49 on an upstream side of the backpressure valve 90. The catalytic device can comprise an SCR device, for example. In the illustrated example, the catalytic device 105 is disposed on a downstream side of the outlet of the turbine 51; however, this is not a limiting factor as the catalytic device may be positioned on an upstream side of the turbine's inlet. In instances wherein the opposed-piston engine 8 operates by combusting diesel fuel, the SCR may be part of an exhaust aftertreatment system comprising other aftertreatment devices. In such cases other components of the aftertreatment system may include a diesel oxidation catalyst (DOC) 106, a diesel particulate filter (DPF) 108, and possibly, other aftertreatment devices. The positioning of aftertreatment devices illustrated in FIG. 4 is not limiting as the devices may be distributed in various sequences in the exhaust passage 49. For non-diesel, gasoline, and mixed-fuel applications of the opposed-piston engine, the catalytic device 105 can comprise an SCR combined with various other aftertreatment devices.

When the opposed-piston engine 8 is off, a start procedure may be performed to initiate engine operation with a starter motor device 110 engaged with a crankshaft of the opposed-piston engine 8. The starter motor device 110 is controlled by the ECU 94 by way of a crank command (Crank). The start procedure may include initially cranking the opposed-piston engine 8 with the starter motor device 110 when an Engine Start signal 112 is generated by way of one or more of an ignition switch, a starter button, or equivalent. In a pre-crank mode of the start procedure, the starter motor 110 begins to rotate the crankshaft while the ECU 94 notes the speed of the crankshaft by way of engine speed sensor 97. When a target crankshaft speed is reached, engine control passes to a crank mode during which combustion is initialized and stabilized. When the crankshaft speed reaches a target running speed during crank mode, engine control passes to a run mode, wherein the ECU 94 sets engine control targets to run mode calibration settings, enables auxiliary engine functions, and turns off the starter motor 110. During the pre-crank mode of a cold-start procedure, the ECU 94 may, before injecting fuel, prevent air flow out of the engine while cranking the engine to heat air retained in the engine, followed by controlling mass air flow through and fuel injection into the engine according to cold-start schedules during the crank mode so as to create and preserve heat for stable combustion and transition to an idling state of operation. See, for instance, cold start strategies for opposed-piston engines described in commonly-owned US publication 2015/0128907.

Once cranking ends and the opposed-piston engine 8 has reached run mode, the ECU 94 continually determines an exhaust gas condition indicative of the temperature of the catalyst ("catalyst temperature") by one or more of calculation, estimation, table look-up, or equivalent procedure, based on sensed conditions of the exhaust gas flow in the exhaust passage. In some instances the catalyst temperature may be indicated by the output of an exhaust gas temperature sensor disposed in the exhaust passage 49 proximate an inlet of the catalytic device. Thus, for example, the exhaust gas temperature sensor 102, which may be a physical device electrically connected to the ECU 94, can be disposed in the exhaust passage 49 between a downstream side of the outlet of the turbine 51 and an upstream side of an inlet of the SCR 105. In this case, the catalyst temperature value determined by the ECU 94 may be considered as an inlet temperature ($T_{Cat\text{-}in}$) of the SCR 105, detected by the exhaust gas temperature sensor 102.

A threshold value ($T_{Cat\text{-}LO}$) maintained by the ECU 94 may correspond to a calibrated value of a light-off temperature of the catalyst. The ECU 94 compares the SCR inlet temperature ($T_{Cat\text{-}in}$) to the threshold value ($T_{Cat\text{-}LO}$) in order to determine whether the temperature of the catalyst is near or less than its light-off temperature. In such cases, the ECU 94 executes a catalyst light-off procedure to elevate the temperature of the catalyst by increasing exhaust gas heat provided to the catalytic device. This procedure may be activated immediately after startup, during any extended idle or other low-load state (as when a vehicle is not moving, for example), or during transient conditions resulting from torque demands, in order to elevate and/or maintain the temperature of the catalyst.

With an opposed-piston engine configuration as illustrated in FIG. 4, the ECU 94 may execute a method with which the air handling system of the opposed-piston engine 8 is controlled to rapidly heat exhaust gas so as to quickly light off a selective catalyst reduction device of an aftertreatment system during a cold start of the engine, and/or while maintaining low engine-out NOx during regular operation of the engine. In this regard, when the opposed-piston engine 8 is initially started after having been turned off, the ECU 94 activates the starter motor device 110. Before run mode control commences, the ECU 94 may execute a cold start procedure to achieve stable combustion. At commencement of run mode control, the ECU 94 may transition engine operation to an idling state. With combustion stabilized, the ECU 94 evaluates catalytic operation by monitoring a thermal condition of the exhaust gas to determine whether to execute a catalyst light-off procedure with which the temperature of the catalyst is elevated. The objective may be to elevate the catalyst temperature to a light-off level or to a level in an effective range where the catalyst operates optimally.

Without regard to how the opposed-piston engine may be started, when the opposed-piston engine operates in an idling state or a hot steady state, the ECU 94 evaluates catalytic operation by monitoring a condition of the exhaust gas to determine whether a catalyst light-off mode of control is needed to elevate the temperature of the catalyst.

The exhaust gas condition monitored by the ECU 94 to evaluate catalyst temperature may comprise a thermal condition such as a temperature of the exhaust gas or an enthalpy of the exhaust gas.

First Embodiment: A first embodiment of a catalyst light-off method of controlling the opposed-piston engine 8 may be understood with reference to FIGS. 4 and 5. When an engine start signal 112 is input to start the engine (step S1), the ECU 94 generates a Crank signal to activate the starter motor device 110, which commences to crank the opposed-piston engine 8. While cranking continues, the ECU 94 may execute a cold start procedure to quickly initiate and stabilize combustion. At the transition to run mode control, engine operation enters a stable idling state. During this initial period, the ECU 94 reads various sensors to determine engine speed and engine load, and reads the exhaust gas temperature sensor 102 to determine whether a catalyst light-off control mode should be activated. An engine state check can also be executed by the ECU 94 using the engine speed sensor 97 to detect when the engine control transitions out of the crank mode (step S2). When the crank mode is completed, the ECU 94 transitions to a run mode control procedure. Upon entering the run mode, the ECU 94 checks the catalyst temperature (step S3). If the catalyst temperature check indicates a catalyst light-off control mode is not required, the ECU 94 may switch to a normal (or HSS (hot steady state)) run control mode of engine control that transitions the engine to a normal or steady-state operating condition for maximum fuel efficiency (step S3 to step S9). As per FIG. 5, the catalyst light-off method continually loops from step S9 through step S3 to check the catalyst temperature. In the normal run control mode, the ECU 94 will check engine speed, engine load, and other parameters to determine appropriate settings for the air and fuel handling systems.

When the ECU 94 detects that the temperature of the catalyst is near or less than a light-off temperature by comparing the SCR inlet temperature ($T_{Cat\text{-}in}$) with the threshold value ($T_{Cat\text{-}LO}$) in step S3, the ECU 94 next reads sensors 96 and 97 to determine whether engine load and engine speed indicate that the engine is in an idling state of operation (step S4). When the ECU 94 determines that a catalyst light-off procedure should be executed while the opposed-piston engine 8 is idling, it will execute an idling catalyst light-off procedure (step S5) by taking the following actions: increasing the mass airflow to the intake port or ports and closing the backpressure valve. In this regard, the turbocharger 50 is regulated by the ECU 94 to increase the speed of the turbine 51, the supercharger 60 is regulated by the ECU 94 to accelerate mass airflow into the intake port or ports of the engine 8, and the backpressure valve 90 will be closed by the ECU 94. Increasing the speed of the turbine 51 causes the compressor 52 to spin faster, which increases (boosts) the pressure of charge air generated by the compressor 52. If the turbine 51 is a fixed geometry device, its speed may be increased by closure of the wastegate 92, which increases exhaust gas flow into the turbine inlet. If a variable geometry (VGT) device, the turbine's speed may be increased by closure of its adjustable elements (such as vanes or nozzle). In some cases, the air handling system may be equipped with one or more EGR loops; in such instances the ECU 94 may close the EGR valve (or valves, if there is more than one EGR loop) in step S5. These actions and closure of the backpressure valve 90 will lead to reduction of the scavenging ratio which, in turn, will increase the amount of trapped residual gas in the cylinder. This will consequently increase the in-cylinder and exhaust gas temperature. At the same time, the ECU 94 may regulate the supercharger 60 by closing the bypass valve 82 and/or commanding the drive 95 to a high drive ratio, which will cause the supercharger to increase provision of pressurized charge air to the intake port or ports of the engine, thereby compounding the boost of the compressor 52. This will cause higher pumping losses which lead to higher fuel quantities commanded by the ECU 94 that will result from an attempt by the ECU 94 to maintain the same speed, ultimately resulting in increased combustion and higher exhaust temperatures. From step S5, the ECU 94 will loop back to the test of $T_{Cat\text{-}in}$ in step S3 and maintain these catalyst light-off conditions by looping through steps S5, S3, and S4 for so long as $T_{Cat\text{-}in}$ fails the check in step S3. The ECU 94 will switch (step S3 to step S9) to a run control mode for normal engine operation when $T_{Cat\text{-}in}$ rises above the threshold value. In the normal control mode, the ECU 94 will perform step S9 by checking engine speed, engine load, and other parameters to determine appropriate settings for the air and fuel handling systems, while continuously cycling through step S3 to perform the check of $T_{Cat\text{-}in}$.

In step S4, if the engine load sensor 96 indicates a transient engine condition to the ECU 94 when a catalyst light-off requirement is determined, the ECU 94 will execute step S6 to check whether the transient condition is a "tip-in" transient condition (e.g., a positive transient intensity resulting from acceleration, an increase in engine load, a demand for increased fuel or torque, etc.) or a "tip-out" transient condition (e.g., a negative transient intensity, resulting from deceleration, a reduction in engine load, a demanded decrease in fuel or torque, etc.). Depending on how aggressive a load change is, the load transient intensity will be impacted. Slight changes (low intensity transients) as may be sensed under low-load operating conditions may therefore be classified in step S6 as tip-in or tip-out transient conditions, as well as large changes (high intensity transients). The transient intensity will, in turn, determine the extent of change in air system actuator settings and fuel system actuator settings through calibration.

If a tip-in transient condition is detected, the ECU 94 will execute a tip-in catalyst light-off procedure (step S7) by taking the following actions: commanding a sharp increase of mass airflow to the intake port or ports of the opposed-piston engine 8, and commanding an increase the amount of fuel being injected. The ECU 94 may regulate the turbine to increase its speed, which causes the compressor to spin faster, thereby increasing (boosting) the pressure of charge air generated by the compressor. If the turbine 51 is a fixed geometry device, its speed may be increased by closure of the wastegate 92. If a variable geometry (VGT) device, the turbine's speed may be increased by closure of its adjustable elements (such as vanes or nozzle). Simultaneously with regulating the turbine 51, the ECU 94 may also regulate the supercharger 60 by closing the bypass valve 82 to increase the boost of charge air provided to the intake port or ports of the engine 8. During tip-in transient conditions, the inertia of the air handling system components may delay the response of the air handling system to the commanded air flow. Closing the bypass valve 82 decreases the response time of the supercharger 60 to the demand. If the opposed-piston engine 8 is equipped with a multispeed drive 95 and a bypass valve 82, then the bypass valve will be closed and the drive will be commanded to a higher drive ratio or a faster speed. This will ensure a quick increase in delivery of mass air flow. In some cases, the air handling system may be equipped with one or more EGR loops; in such instances the ECU 94 may close the EGR valve (or valves) by a desired angle, for example, an angle of between 0° (fully closed) and 10° (partially open). The ECU 94 may issue Rail pressure commands to achieve a commanded fuel pressure, based on an intensity of the transient, in order to help lower soot during a up-ramp transient. For example, rail pressure may be increased by an amount in the range of 110% to 125%. The ECU 94 may also advance injection timing to generate more heat of combustion, resulting in higher exhaust temperature. For example, injection timing may be advanced by an amount in the range of 2° (crank angle) to 6° (crank angle). The ECU 94 may also execute a smoke limiter, if so equipped, to prevent excessive enrichment of the air/fuel mixture. The temperature of the catalyst will be checked continuously by the ECU 94 as it cycles through steps S3, S4, S6, and S7. The ECU 94 will switch (step S3 to step S9) to a control mode for normal engine operation when $T_{Cat\text{-}in}$ rises above the threshold value. In the normal run control mode, the ECU 94 will perform step S9 by checking engine speed, engine load, and other parameters to determine appropriate settings for the air and fuel handling systems, while continuously cycling through step S3 to perform the check of $T_{Cat-in}$.

If a tip-out transient condition is detected in step S6, the ECU 94 will execute a tip-out catalyst light-off procedure (step S8) by taking the following actions: commanding a sharp decrease of mass airflow to the intake port or ports of the opposed-piston engine 8, and commanding a decrease in the amount of fuel being injected. The ECU 94 may fully open the bypass valve 82 to reduce air delivery by the supercharger 60 to the intake port or ports of the engine. In some cases, the air handling system may be equipped with an EGR loop; in such instances the ECU 94 may open the EGR valve or valves to a desired maximum angle in order to assist in reduction of air delivery. The ECU 94 may close the backpressure valve 90 to a minimum angle in order to increase backpressure in the exhaust passage. For example, the backpressure valve angle may be closed to an angle of between 25° and 35°. The ECU 94 may retard injection timing, based on the intensity of the transient. For example, injection timing may be retarded by an amount in the range of 2° (crank angle) to 4° (crank angle). The temperature at the after-treatment catalyst, will be checked continuously by the ECU 94. The ECU 94 will continuously cycle through steps S3, S4, S6, and S8 and will switch (step S3 to step S9) to a run control mode for normal engine operation when $T_{Cat-in}$ rises above the threshold value. In the normal run control mode, the ECU 94 will perform step S9 by checking engine speed, engine load, and other parameters to determine appropriate settings for the air and fuel handling systems, while continuously cycling through step S3 to perform the check of $T_{Cat-in}$.

Figure 6:
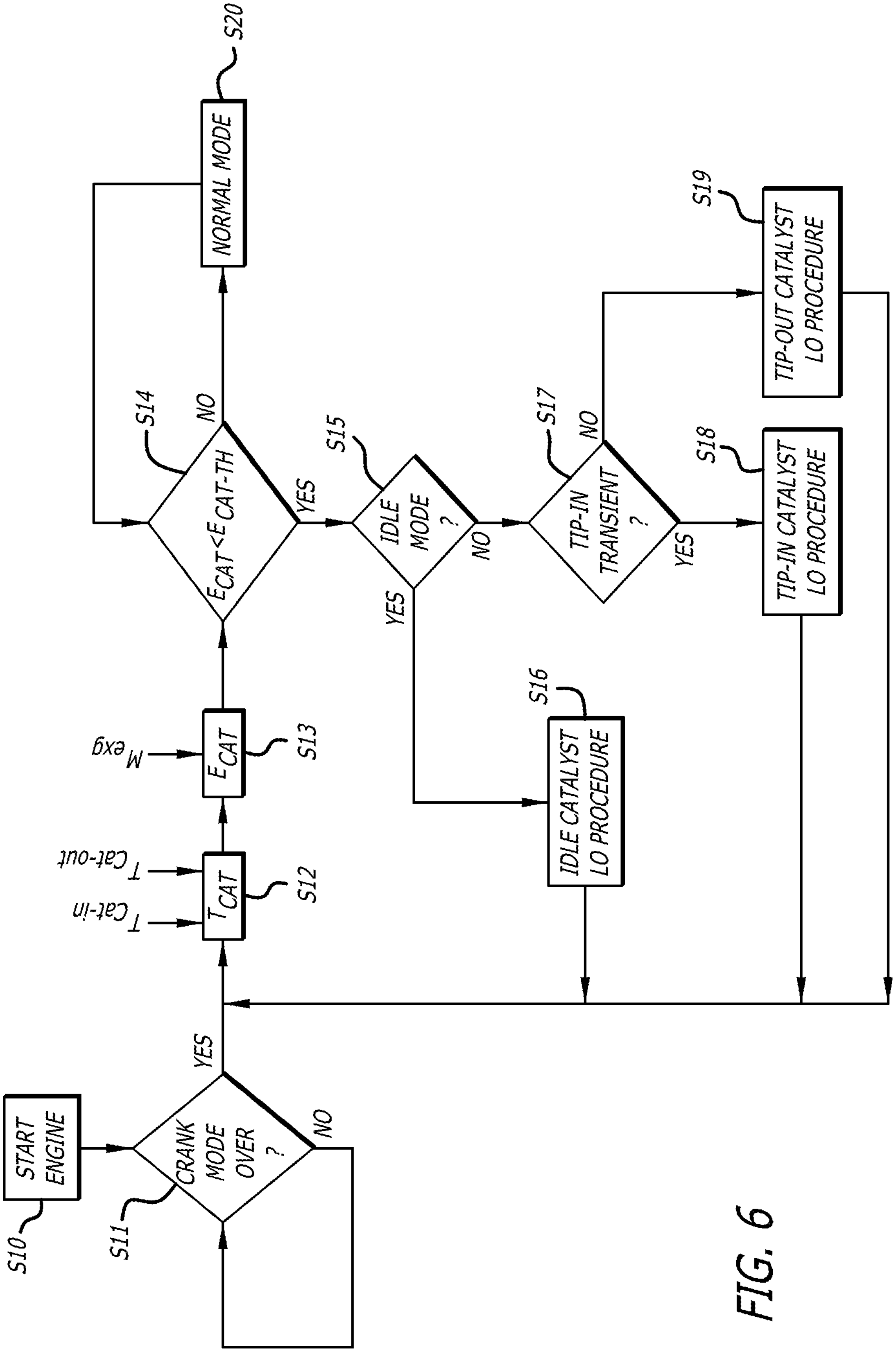
FIG. 6 is a flowchart illustrating a second embodiment of a method of fast catalyst light-off in the exemplary opposed-piston engine according to the invention.

Second Embodiment: A second embodiment of a catalyst light-off mode of controlling the opposed-piston engine 8 may be understood with reference to FIGS. 4 and 6. In this embodiment, the ECU 94 may determine, by one or more of estimation, calculation, and table look-up, a value of exhaust enthalpy based on a catalyst temperature value indicative of a temperature of the catalyst in the SCR 105 and an exhaust mass flow rate value indicative of a mass flow rate of exhaust gas in the exhaust passage 49.

In the second embodiment, a catalyst temperature ($T_{CAT}$) is determined, calculated, or estimated by the ECU 94 on the basis of a difference between the inlet temperature ($T_{Cat-in}$) of the catalytic device and an outlet temperature ($T_{Cat-out}$) of the catalytic device, and, possibly, other parameters. This embodiment may be implemented by an exhaust gas temperature sensor arrangement including the first exhaust gas temperature sensor 102 to detect $T_{Cat-in}$ and a second exhaust temperature sensor 103 located in the exhaust passage 49, proximate an outlet of the catalytic device, to detect exhaust gas temperature on a downstream side of an outlet of the SCR. In this case, the catalyst temperature value estimated by the ECU 94 may be determined, calculated, or estimated by the ECU 94, based on a difference between $T_{Cat-in}$, detected by the first exhaust gas temperature sensor 102, and $T_{Cat-out}$, detected by the second exhaust gas temperature sensor 103.

An exhaust mass flow rate value ($M_{exg}$) indicative of a mass flow rate of exhaust gas in the exhaust passage 49 is determined, calculated, or estimated by the ECU 94 on the basis of engine operating parameters including mass air flow into the engine, engine load, engine speed, and, possibly, other parameters. Current values of these engine operating parameters are detected by various sensors including the mass airflow sensor 100, the engine speed sensor 97, the engine load sensor 96, and, possibly, other sensors. These current values are provided to processing modules maintained by the ECU 94 that may comprise empirically-derived calibration maps or mathematical models.

Figure 5:
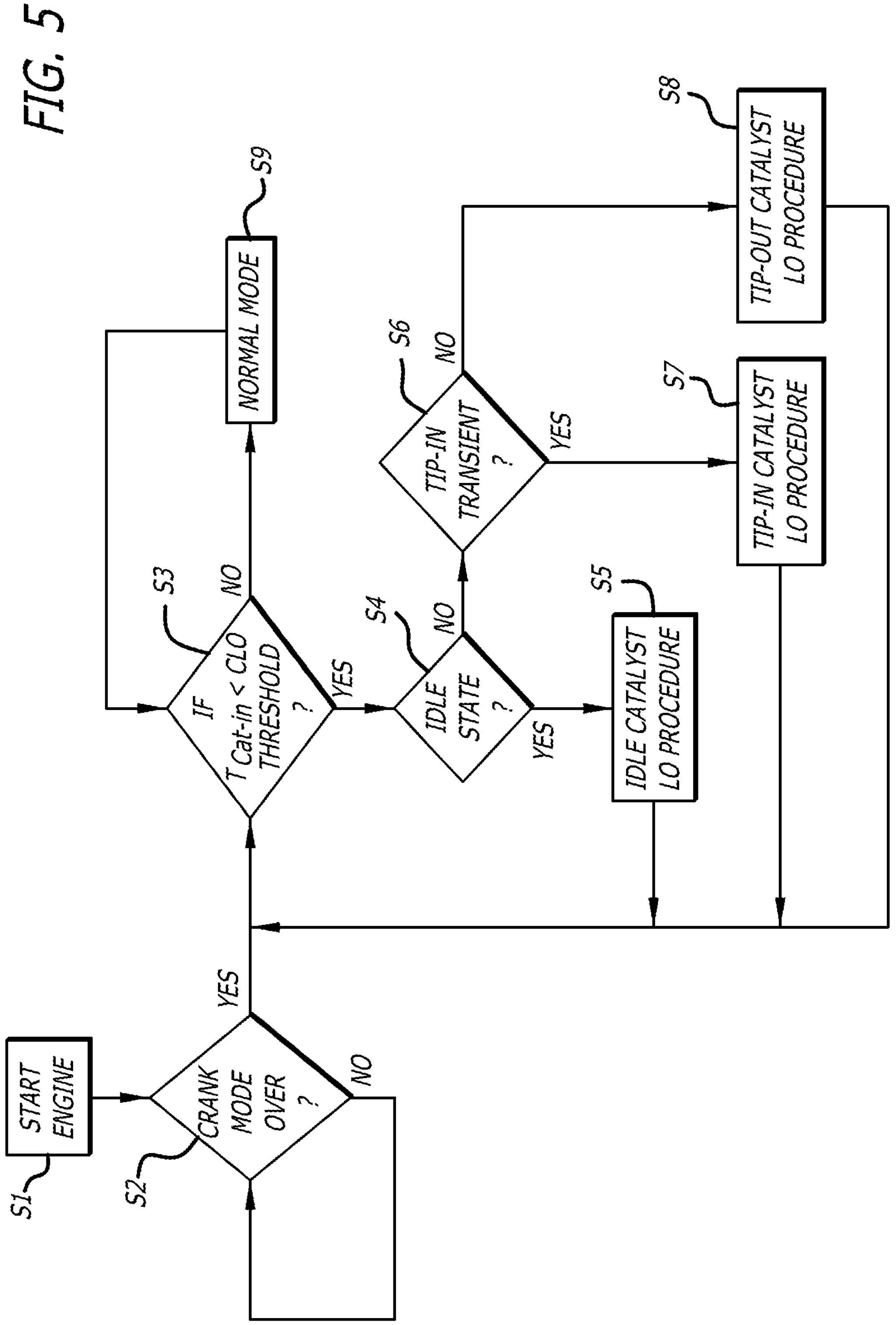
FIG. 5 is a flowchart illustrating a first embodiment of a method of fast catalyst light-off in the exemplary opposed-piston engine according to the invention.

Upon starting the opposed-piston engine 8 cold, the ECU 94 initiates a cold start mode (step S10) in the manner described with respect to step S1 of FIG. 5 by generating a Crank signal to activate the starter motor device 110, which commences to crank the opposed-piston engine 8. While cranking continues, the ECU 94 executes a cold start procedure which includes initiating and stabilizing combustion, and transitioning engine operation to a stable idling state.

During this initial cold start mode, the ECU 94 reads various sensors to determine engine speed and engine load, and reads the mass air flow sensor 100, the first exhaust gas temperature sensor 102, and the second exhaust gas temperature sensor 103. An engine state check can also be executed by the ECU 94 using engine speed sensor 97, to detect when the engine transitions out of the crank mode (step S11). When cranking is completed, the ECU 94 transitions to a run control mode. When stable combustion is achieved, the ECU 94 determines, estimates, or calculates (step S12) a catalyst temperature value ($T_{CAT}$) based on ($T_{Cat-in}$) and ($T_{Cat-out}$). For example, the ECU 94 may perform the calculation $T_{CAT}=((T_{Cat-in})-(T_{Cat-out}))$. As another example, the ECU 94 may calculate $T_{CAT}$ as an average value of two or more differences $((T_{Cat-in})-(T_{Cat-out}))$. Alternatively, $T_{CAT}$ may be determined by table look-up. The ECU 94 also determines, estimates, or calculates an exhaust mass flow rate value ($M_{exg}$) based on mass air flow into the engine, engine speed, and engine load. Using the catalyst temperature and the exhaust mass flow rate, the ECU 94 also determines, estimates, or calculates (step S13) an enthalpy value ($E_{Cat}$) of the exhaust gas flowing through the SRC 105. For example, the ECU 94 may perform the calculation $E_{CAT}=((T_{CAT})\times(M_{exg}))$. Alternatively, $E_{Cat}$ may be determined by table look-up. The ECU 94 also maintains a threshold enthalpy value ($E_{Cat-TH}$) that may correspond to a desired value of enthalpy of the exhaust gas. In step S14, the ECU 94 determines whether the enthalpy of exhaust gas flowing through the SCR 105 has been less than the threshold enthalpy value for a predetermined residence time. If ($E_{Cat}<E_{Cat-TH}$) for a predetermined period of time, the conclusion is that the catalyst is insufficiently heated to perform at a desired level of operation, in which case the positive exit is taken from the decision at step S14. The remainder of the second embodiment catalyst light-off procedure then proceeds in a manner corresponding to steps S4 through S8 of FIG. 5. In this regard, if an idle state of engine operation is detected at step S15, the ECU 94 conducts the idle catalyst light-off procedure (step S16) as in step S5 of FIG. 5. If, on the other hand, an idling state is not detected at step S15, the ECU 94 detects a current transient state of engine operation (step S17) and performs either the tip-in catalyst light-off procedure (step S18) as in step S7 of FIG. 5, or the tip-out catalyst light-off procedure (step S19) as in step S8 of FIG. 5. If the enthalpy check at step S14 indicates a catalyst light-off control procedure is not required (negative exit from the decision at step S14), the ECU 94 may execute step S20 by operating in or switching to a normal control mode for maximum fuel efficiency (as in step S9 of FIG. 5).

Additional Steps: The first and second embodiments of a catalyst light-off procedure illustrated in FIGS. 5 and 6 may employ steps in addition to those already described in order to further increase the exhaust temperature. For example, one or more charge air coolers in the charge air passage 48 may be bypassed during a catalyst light-off procedure according to the invention, particularly during a cold start step, by reducing or stopping flow of coolant in order to reduce heat extracted from charge air. This will then lead to warmer fresh charge temperatures propagating through the exhaust passage 49.

In another example, the wastegate 92 may be regulated to an open position during an idle step of a catalyst light-off procedure according to the invention. By opening the wastegate, some of the enthalpy from the exhaust gas flow which would normally heat up the turbine 51 will be retained in the exhaust gas flow, thereby producing a higher exhaust gas temperature to the catalyst.

Additionally, the idle speed during an idle step of a catalyst light-off procedure according to the invention may be increased compared to a normal or HSS run control mode. This will result in higher friction which will require more fueling to sustain the higher idle speed. Thus higher exhaust temperatures will be achieved as a result of higher fueling. The idle speed will drop to normal target speeds as a function of coolant temperature, after the temperatures at the after-treatment catalyst are above calibrated value to ensure NOx reduction In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims.

We claim:

1. A catalyst light-off apparatus for an opposed-piston engine, comprising:

an exhaust passage configured to receive a flow of exhaust gas produced by combustion of a mixture of air and fuel in a cylinder of the opposed-piston engine;

a catalyst apparatus disposed in the exhaust passage, in series with a turbine of a turbocharger;

an exhaust gas sensor arrangement configured to detect an exhaust gas condition of the exhaust gas that indicates a catalyst temperature of the catalyst apparatus;

an engine control unit electrically connected to the exhaust gas sensor arrangement and programmed to:

perform a cold start procedure to initiate a fuel-injected, compression-ignition mode of operation by cranking the opposed piston engine;

determine whether a stable combustion is achieved during the cold start procedure;

when the stable combustion is achieved, determine whether the exhaust gas condition indicates that a temperature of the catalyst is below a light-off temperature of the catalyst; and, when the temperature of the catalyst is below the light-off temperature of the catalyst, increase a flow of pressurized charge air into an intake port of the cylinder and restrict the flow of exhaust gas in the exhaust passage until the exhaust gas condition indicates that the temperature of the catalyst exceeds the light-off temperature.

2. The catalyst light-off apparatus of claim 1, wherein the exhaust gas condition is an exhaust gas temperature and the exhaust gas sensor arrangement comprises an exhaust gas temperature sensor disposed in the exhaust passage on an upstream side of the catalyst apparatus.

3. The catalyst light-off apparatus of claim 1, wherein the exhaust gas condition is an exhaust gas temperature and the exhaust gas sensor arrangement comprises an exhaust gas temperature sensor disposed in the exhaust passage between a turbine outlet of the turbocharger and inlet of the catalyst apparatus.

4. The catalyst light-off apparatus of claim 1, further comprising a mass airflow sensor in a charge air passage of the opposed-piston engine, wherein the exhaust gas condition is an exhaust gas enthalpy and the exhaust gas sensor arrangement comprises a first exhaust gas temperature sensor on an upstream side of the catalyst apparatus and a second exhaust gas temperature sensor on a downstream side of the catalyst apparatus, and wherein the engine control unit is further programmed to calculate the exhaust gas enthalpy based on a mass flow of air through the charge air passage of the opposed-piston engine and a difference between a first exhaust gas temperature detected by the first exhaust gas temperature sensor and a second exhaust gas temperature detected by the second exhaust gas temperature sensor.

* * * * *